United States Patent
Johnson et al.

[11] Patent Number: 6,047,494
[45] Date of Patent: *Apr. 11, 2000

[54] MECHANICAL ENGAGEMENT GLUE BOARD AND DISPENSER

[75] Inventors: Daniel C. Johnson; Richard L. Leyerle, both of Madison, Wis.

[73] Assignee: Bell Laboratories, Inc., Madison, Wis.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/644,267

[22] Filed: May 10, 1996

Related U.S. Application Data

[63] Continuation-in-part of application No. 08/440,006, May 12, 1995, Pat. No. 5,577,342.

[51] Int. Cl.⁷ ....................................................... A01M 1/14
[52] U.S. Cl. .................................. 43/58; 43/114; 206/594
[58] Field of Search .................. 43/58, 114; 229/120.07, 229/120.32; 206/449, 587, 594

[56] References Cited

U.S. PATENT DOCUMENTS

| | | |
|---|---|---|
| 731,843 | 6/1903 | Bierley . |
| 2,138,926 | 12/1938 | Karfiol ..................................... 43/114 |
| 4,244,134 | 1/1981 | Otterson ..................................... 43/58 |
| 4,685,244 | 8/1987 | Marks ........................................... 43/58 |
| 5,577,342 | 11/1996 | Johnson et al. . |
| B1 4,438,584 | 4/1987 | Baker et al. ................................ 43/58 |

FOREIGN PATENT DOCUMENTS

| | | |
|---|---|---|
| 581474 | 10/1946 | United Kingdom . |

OTHER PUBLICATIONS

"Active Rat Boards™," *Pest Control,* undated.

"Rats and Mice Eliminated," *Pest Control,* Sep. 1976.

"Now, Trap–Stik™ in trays. Drop 'em in their tracks," Southern Mill Creek Products Company, Inc., Tampa, Florida, undated.

"Rodent Control Product and Label Guide, 1994 Edition, Bell Laboratories, Inc.," Madison, Wisconsin, pp. 1, 17, 22 and 23.

Exhibits A, B, C, D, and E are photographs of PIC® Mouse Glue Traps, manufactured by Pic Corp., of Orange, N.J.

*Primary Examiner*—David A. Scherbel
*Assistant Examiner*—Anthony Ojini
*Attorney, Agent, or Firm*—Lathrop & Clark LLP

[57] ABSTRACT

Rodents are entrapped in hot melt adhesive which is disposed on a thermoformed thermoplastic base sheet which has a series of closely spaced ridges defining a rodent runway extending the length of the base sheet. The ridges create a series of depressed valleys which receive the adhesive and engage the quantity of adhesive with the base sheet to mechanically retain the adhesive against shifting off the base sheet. A substantially unobstructed expanse of adhesive without exposed ridges is presented on the runway for encounter by a rodent. Two stiffening ribs extend upwardly from the base sheet on either side of the runway to rigidify the base sheet. Multiple protrusions extend adjacent to each stiffening rib exterior to the runway. The protrusions are engaged on top and bottom by parallel projections of rack members within a papers or corrugated container such that multiple glue boards may be stored and dispensed.

12 Claims, 6 Drawing Sheets

MECHANICAL ENGAGEMENT GLUE BOARD AND DISPENSER

RELATED APPLICATION

This application is a continuation-in-part of U.S. application Ser. No. 08/440,006, filed May 12, 1995, and issued Nov. 26, 1996, as U.S. Pat. No. 5,577,342.

FIELD OF THE INVENTION

This invention relates to devices for removing targeted rots in general, and in particular to devices which utilize an adhesive substance for entrapping rodents.

BACKGROUND OF THE INVENTION

Throughout history, rodents such as mice and rats have been persistent pests, consuming food supplies, soiling human habitations and workplaces, and spreading contaminants and disease. Rodents may be killed by the placement of poison in a form attractive to the rodent. However, in certain applications poisoned bait may be ineffective, for example in a granary where attractive rodent food is omnipresent. In other applications, poison may be unacceptable because of the close proximity to human food or non-target species, including pets.

Mechanical traps which use stored kinetic energy to enclose or crush the rodent have the advantage of retaining the dead rodent at a specific site for disposal. However, the moving parts of a mechanical trap add to the cost of manufacture.

Adhesive devices have been developed which present an expanse of highly retentive glue along a path frequented by rodents. A rodent making contact with the adhesive will be held and prevented from departure. Eventually the rodent will become suffocated in the adhesive, or will otherwise die. The glue containing board and dead rodent may then be disposed of as a single unit.

Convenient packaging and shipment of glue boards is of great concern. The adhesive nature of the such devices means that they must be shielded from contact with dirt and debris prior to use, lest its adhesive properties be reduced. Furthermore, for convenience to the user, the adhesive should be shielded from contact with clothing, hands, furniture, etc., until ready to be placed along a rodent way.

Prior art glue boards have employed thermoformed plastic trays to contain the adhesive, and these trays have had indented portions with a flange which extends around the tray significantly above the surface of the entrapping glue. Thus two prior art glue boards may be placed flange to flange, thereby spacing the glue of each from adhesive contact. The spacing of the flange above the glue surface, however, undesirably adds to the thickness of the unit and to the barrier height which the flange presents to the rodent as it approaches the adhesive.

Rodent glue boards filled with a hotmelt adhesive have been developed for shipment nationwide. Shipment by truck and storage of the packaged glue traps will subject the adhesive to elevated temperatures, and conventional glue traps have had to address the possibility of an inverted or oriented trap losing its glue as the adhesive becomes more flowable at higher temperatures. Commonly, flowing of the glue has been lessened by the use of a glue which is more resistant to flow at expected temperatures. Unfortunately, this change almost always comes at the cost of glue tackiness and rodent entrapping strength.

What is needed is an adhesive control device for rodents which allows compact and convenient packaging, which supports ready rodent entrapment, and which is fully transportable.

SUMMARY OF THE INVENTION

The glue board of this invention employs mechanical engagement of the adhesive to a base sheet and thus permits the use of adhesive of greater tackiness. Rodents are entrapped in a quantity of hot melt adhesive which is disposed on a thermoformed thermoplastic base sheet. The sheet has a series of closely spaced transverse ridges defining a rodent runway which extends across the base sheet. The ridges create a series of depressed valleys which receive the adhesive and engage the quantity of adhesive with the base sheet to mechanically retain the adhesive against shifting off the base sheet. A substantially unobstructed expanse of adhesive is presented on the runway for encounter by a rodent along the surface of the adhesive. A stiffening rib extends upwardly from the base sheet on either side of the runway and serves to rigidify the base sheet. A plurality of protrusions or riblets extend adjacent to each stiffening rib exterior to the runway. The protrusions are slidably engaged on top and bottom by parallel projections of rack members within a container such that multiple glue boards may be stored and dispensed. The container may be formed of paperboard with a plastic insert to define a rack with projections for storing multiple glue boards.

It is an object of the present invention to provide a rodent entrapping glue board which has strong adhesive properties yet which is securely retained on the board.

It is an object of the present invention to provide a rodent entrapping glue board which presents minimal obstacles to the path of a rodent.

It is a farther object of the preset invention to provide a rodent entrapping glue board which is conveniently dispensable.

It is also an object of the present invention to provide rodent entrapping glue boards which are compactly stored and transported for dispensing with minimal occasion for contact between the adhesive and the operator.

It is an additional object of the present invention to provide a rodent entrapping glue board which has improved rodent retentive properties.

It is a further object of the present invention to provide a dispenser for convenient one-handed removal and placement of a single glue board at a time by a consumer or pest control operator.

Further objects, features and advantages of the invention will be apparent from the following detailed description when taken in conjunction with the accompanying drawings.

DESCRIPTION OF THE PREFERRED EMBODIMENT

Referring more particularly to FIGS. 1–9, wherein like numbers refer to similar parts, a glue board 20 is dispensed from a dispenser 22 for placement by a Pest Control Operator (PCO) or consumer.

Each glue board 20 is comprised of two components: a plastic base sheet 24 and a quantity of adhesive 26 disposed on the base sheet. The base sheet is preferably thermoformed of 0.025 inch polystyrene plastic, but may be thermoformed of any suitable plastic material. The glue may be any appropriate hotmelt pressure sensitive adhesive which is sufficiently adhesive to capture a rodent, and yet sufficiently stable to be retained on the base sheet 26 at field temperatures and orientations expected to be encountered by the glue board 20, in stage, shipment and use.

Figure 2:
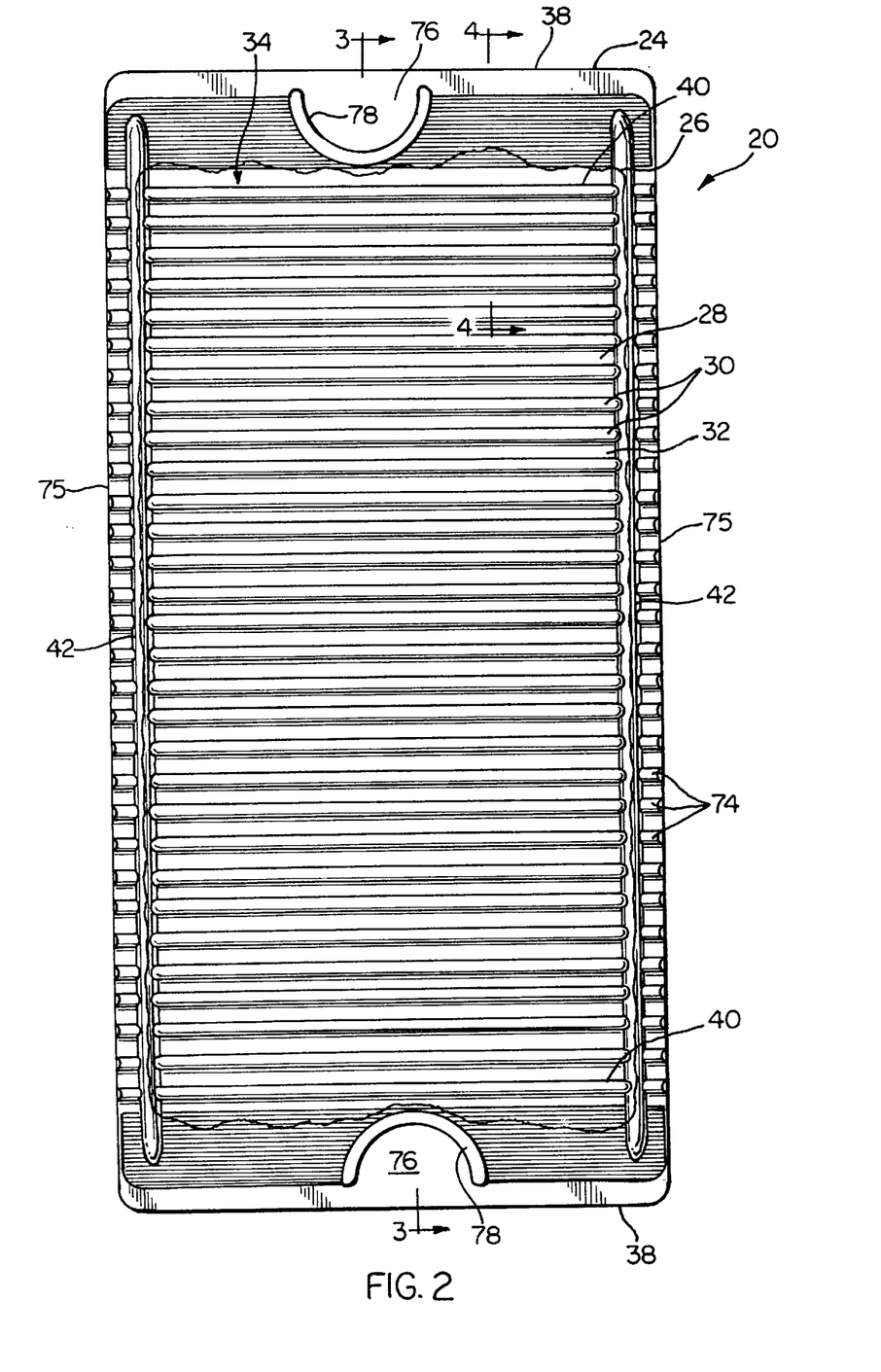
FIG. 2 is a top plan view of the glue board of FIG. 1.
Figure 3:
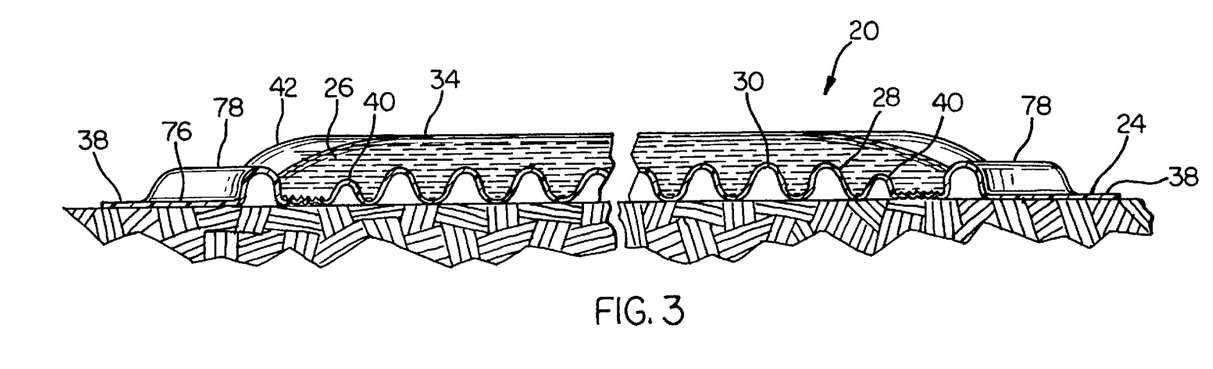
FIG. 3 is a fragmentary cross-sectional view of the glue board of FIG. 2 taken along section line 3—3.
Figure 4:
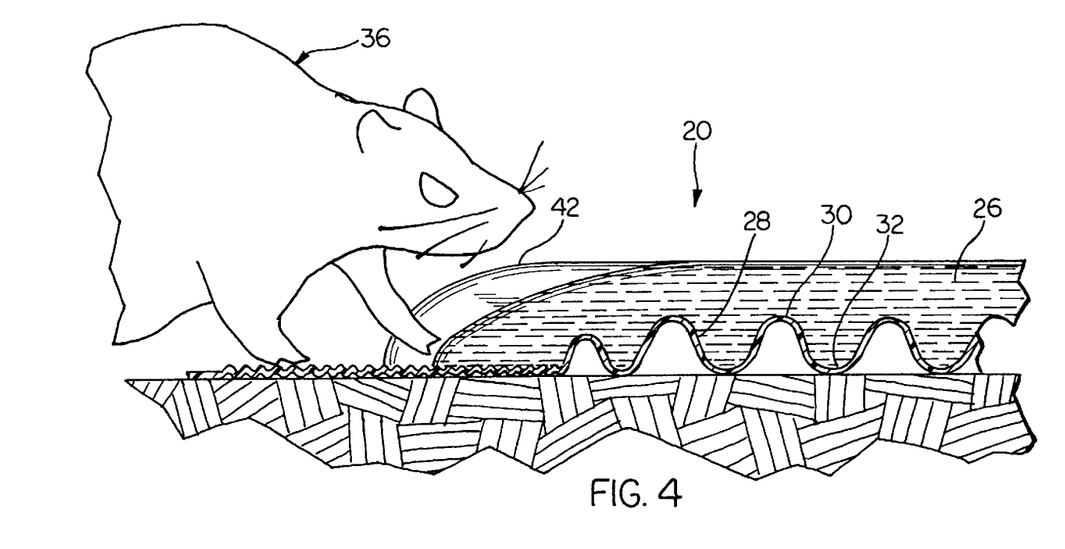
FIG. 4 is an enlarged fragmentary cross-sectional view of the glue board of FIG. 2 taken along section line 4—4 and showing rodent access to the glue board runway.

As shown in FIG. 2, the base sheet 24 is provided with an aggressive mechanical surface 28 composed, for example, of a series of parallel ridges 30 separated by valleys 32. The aggressive mechanical surface 28 defines a rodent runway 34 which extends the length of the glue board 20. In a typical application, the glue board 20 will be positioned along a wall with the runway 34 parallel to the wall to position the adhesive 26 in a path frequented by rodents. As shown in FIGS. 3 and 4, the adhesive 26 cows the ridges 30 to present a clear expanse of adhesive for rodent entrapment.

The aggressive mechanical surface 28 intents with the adhesive 26 in such a way as to give better adherence between the adhesive and the base sheet 24 than would be the case with a simple planar base sheet surface. The aggressive mechanical surface 28 serves to restrain movement of the adhesive in any direction. This improved adherence is useful in shipment of the glue boards where the possibility exists that the glue boards may be vertically oriented or inverted.

In addition, although a fairly narrow depth of adhesive extends above the surfaces of the ridges 30, the valleys 32 with their greater depth of adhesive provide additional adhesive which is continuous with the upper levels of adhesive. The additional adhesive can then be drawn from the valleys when a rodent engages the upper levels of adhesive, making it less likely that a rodent can pull its limbs out of engagement with the glue.

In general, there are three characteristics of adhesive which are of interest in glue board construction: tack and leg, which relate to the retention of a rodent to the adhesive; shelf life, which relates to how long the product may be stored before losing its effectiveness; and resistance to flow. The levels of these characteristics in any batch of adhesive can be adjusted by changing the formulation or manufacturing process of the adhesive. In general, improving the level of any one of the three characteristics will resulted in a reduced level of one or the other or both of the other two. Hence by providing an improved mechanical engagement between the adhesive and the base sheet, the glue board 20 allows an adhesive to be used which has improved qualities in shelf life, adhesiveness, or both.

The aggressive mechanical surface 28 may be formed in a variety of patterns, for example curved or circular ridges of sine wave or saw tooth cross-section. However, by forming the ridges 30 as parallel mess which extend transversely across the base sheet 24 generally perpendicular to the runway 34, the ridges additionally serve to rigidify the base sheet 24 and limit warping or twisting of the glue board 20.

As shown in FIG. 4, the glue board 20 presents minimal impediments to the progress of a rodent 36 onto the runway 34. The access ends 38 of the glue board 20 have no raised lips or ledges which would present a significant obstacle to a rodent stepping onto the adhesive 26. The adhesive 26 extends over the aggressive mechanical surface 28 and terminates at the access ends 38. The adhesive 26 at the access ends 38 will have a thickness, with the result that adhesive surfaces are presented for rodent contact not only facing upwardly, but facing into the path of a rodent approaching the runway 34. To provide additional adhesive for initial entrapment, the initial ridges 40 at each access end 38 may be approximately half the height of the other ridges 30.

The glue board 20 is fisher stiffened by two ribs 42 which extend upwardly from the base sheet 24. As shown in FIG. 2, one rib 42 extends on either side of the runway 34. The ribs 42 may be generally parallel, and extend from one access end 38 to the other. The ribs 42 are approximately at or somewhat below the level of the adhesive 26 on the aggressive mechanical surface 28, depending on the particular conditions of manufacture. The base sheet 24 aggressive mechanical surface 28 provides an engagement and adherence surface which includes projecting portions extending from adjacent recessed portions toward the adhesive entrapment surface, the projecting portions and the recessed portions collectively providing the engagement and adherence surface with a total surface area substantially greater than the area of the adhesive entrapment surface.

The glue board 20 is manufactured by dispensing liquid adhesive 26 from several aligned dispensing nozzles onto a moving base sheet 24. Typically, the base sheet 24 will be moved with respect to the dispensing nozzles such that the nozzles move from one rib 42 to the other rib. The ribs 42 thus perform a secondary function of terminating the flow of adhesive while it is still in a freshly applied liquid state.

Prior art glue boards have sometimes been hampered by structure attached to the boards to allow packaging of two boards in face to face condition without touching. The glue board 20 of this invention achieves benefits of improved rodent accessibility by totally eliminating such structure and thereby opening up the runway to rodent access as discussed above. The glue board 20 is stored and dispensed in any desired multiples, for example four or twelve, by its interaction with the convenient dispenser 22.

Figure 1:
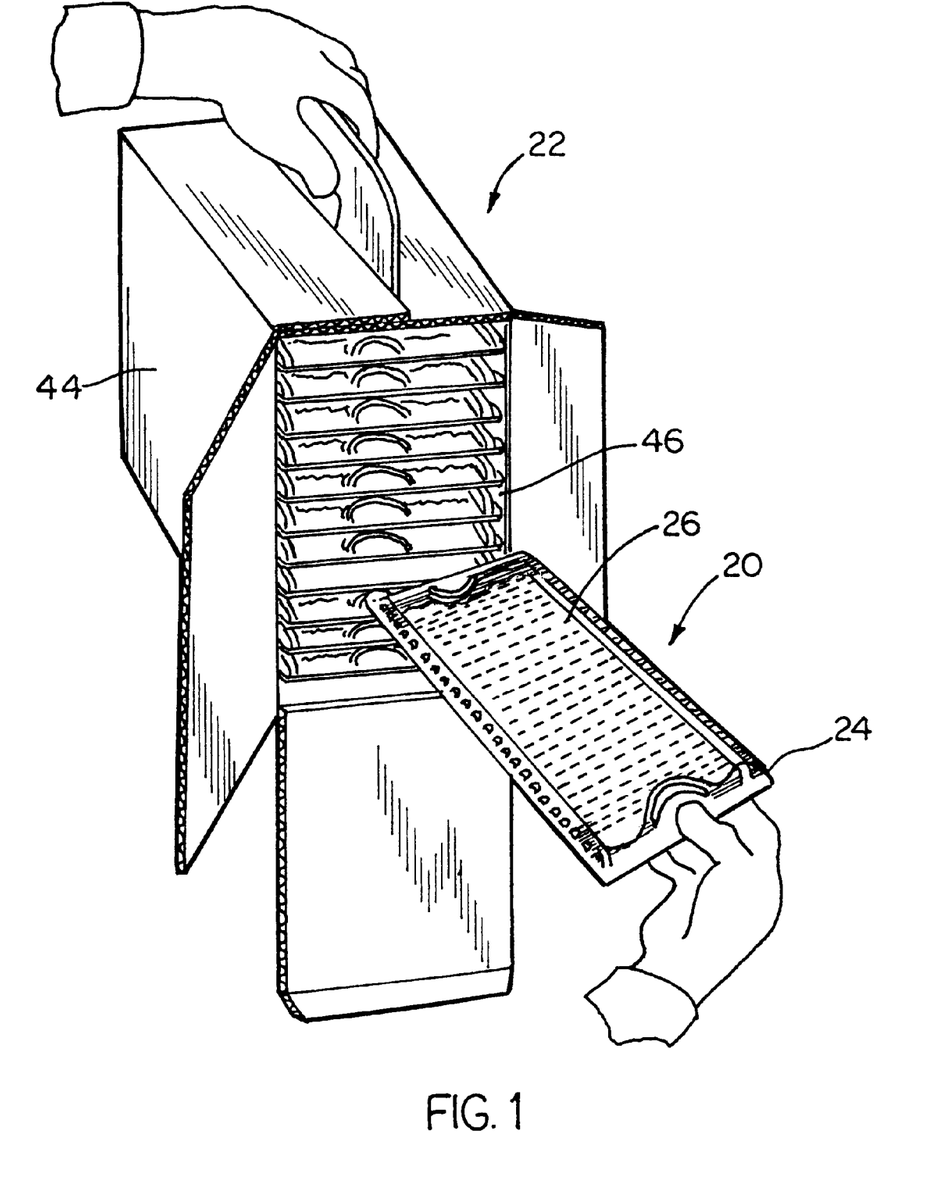
FIG. 1 is a perspective view of a rodent entrapping glue board of this invention being withdrawn from a glue board dispenser of this invention.
Figure 5:
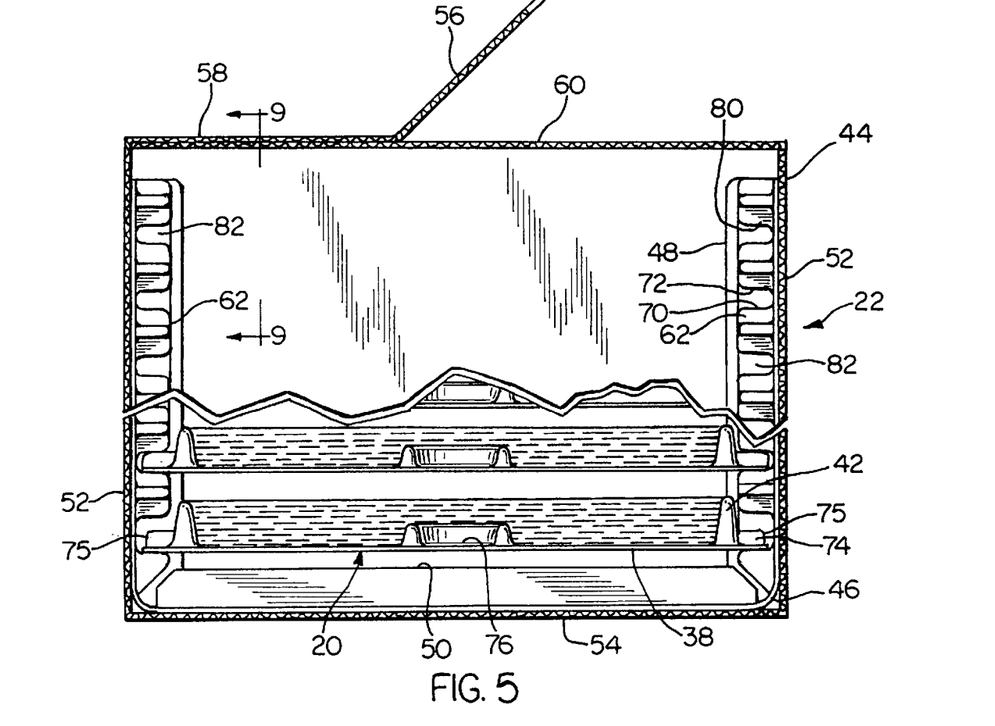
FIG. 5 is a front elevational view of the dispenser of FIG. 1.
Figure 6:
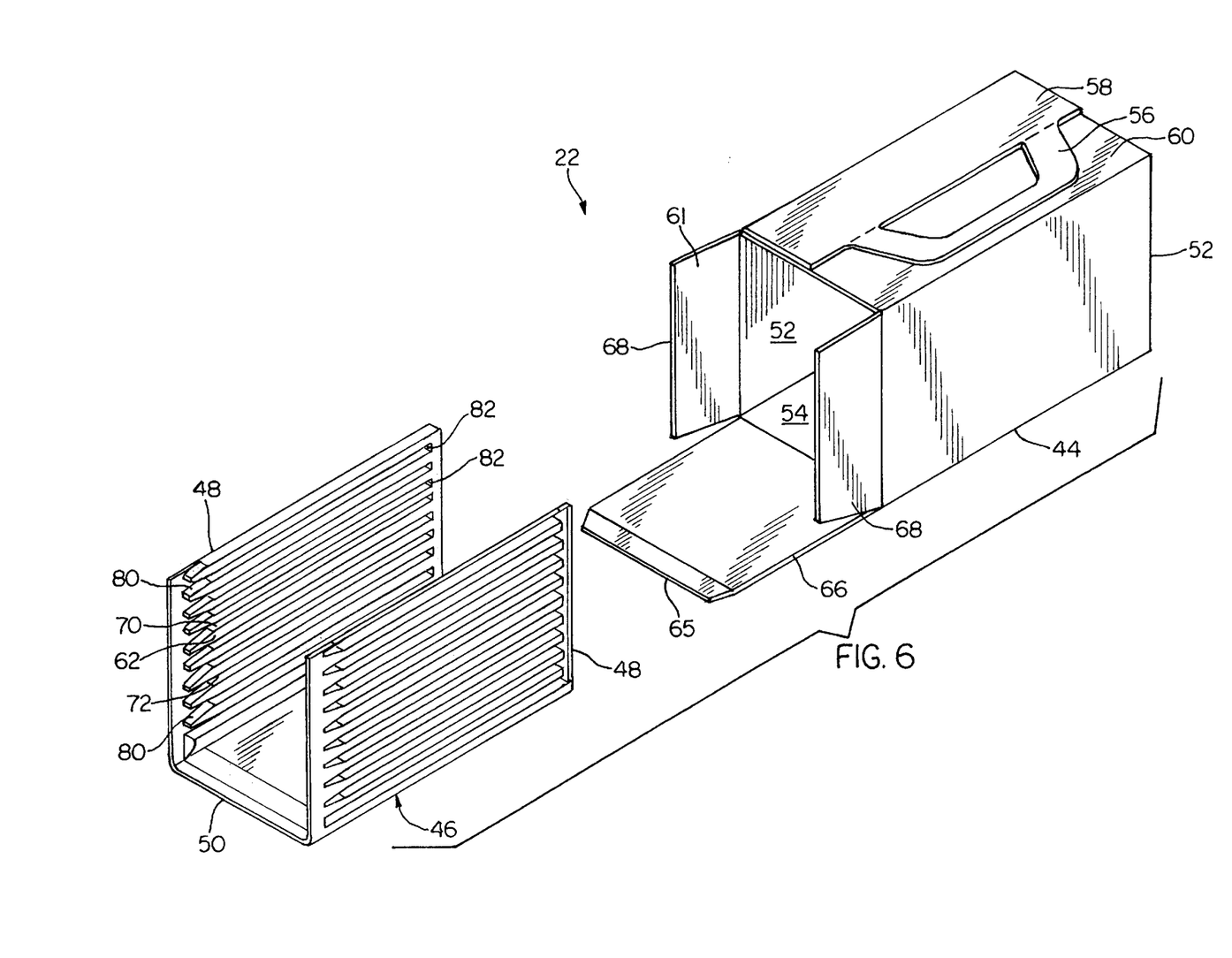
FIG. 6 is an exploded isometric view of the dispenser of FIG. 1

The preferred dispenser 22, as shown in FIGS. 1, 5, and 6, has a paperboard container or box 44 with a thermoformed thermoplastic insert 46 fitted internally in a friction fit. The insert 46, as shown in FIG. 6 has three flaps 48, 50, which are formed together, and then folded to fit within the box 44. The it 46 has a lower member 50 which has molded 45-degree-angle bevels which engage with like bevels in two rack members 48 which extend upwardly from the lower member to lie adjacent the vertical sidewalls 52 when the lower member 50 lies adjacent the box bottom wall 54. The box 44 is preferably formed of stiff corrugated paperboard, and has a handle 56 which extends upwardly from a glue flap 58 which is glued to the top wall 60 of the box 44. The box is preferably provided with an automatic assembly type rear closure, and an access closure 61 which comprises a bottom flap 66 with a tab 65 which closes over two side flaps 68 to close the box 44.

The two rack members 46 extend generally parallel to one another within the box 44, and each rack member has a plurality of parallel projections 62 which extend into the box. As shown in FIG. 5, each projection has an upper surface 70 which engages the underside of the side margin 75 of a glue board 20 in supporting relation, and a lower sure 72 which engages the side margin of a glue board 20 in a retaining relation. The base sheet 24 of a glue board 20 is supported on two opposed projections 62, one on each rack member 46, and is slidable on the two projections for removal from the dispenser 22.

To stiffen the glue board 20 and to facilitate sliding insertion and removal from the dispenser, the side margins 75 of the base sheet 24 are provided with a series of closely spaced riblets 74. As shown in FIGS. 1 and 2, the riblets 74 extend from the stiffening ribs 42 exterior to the runway 34. The riblets 74 may take various forms, but in an exemplary embodiment each riblet may be similar in height and width to the ridges 30 of the aggressive mechanical surface 28. The riblets 74 contribute to stiffening the side margins of the base sheet 24 where they are engaged with the rack members 46. The rack members 46 thus engage the riblets 74 from above and from below in a friction fit which is sufficiently tight to prevent free sliding, but not so tight as to interfere with extraction of a glue board 20 from the dispenser 22 by hand.

Each base sheet 24 is preferably molded with structure to assist in board handling within the dispenser 22. A planar finger grip 76 is define on each access end 38 and is surrounded by a lip 78 which protrudes around the finger grip 76 and serves to prevent the incursion of adhesive 26 onto the finger grip. The finger grip 76 provides a glue-free region of the board 20 for convenient grasping by the thumb and forefinger of a user. Thus grasped, a board 20 may easily be extracted from the dispenser and placed in use position with one hand without bringing the user into contact with the adhesive 26.

Figure 9:
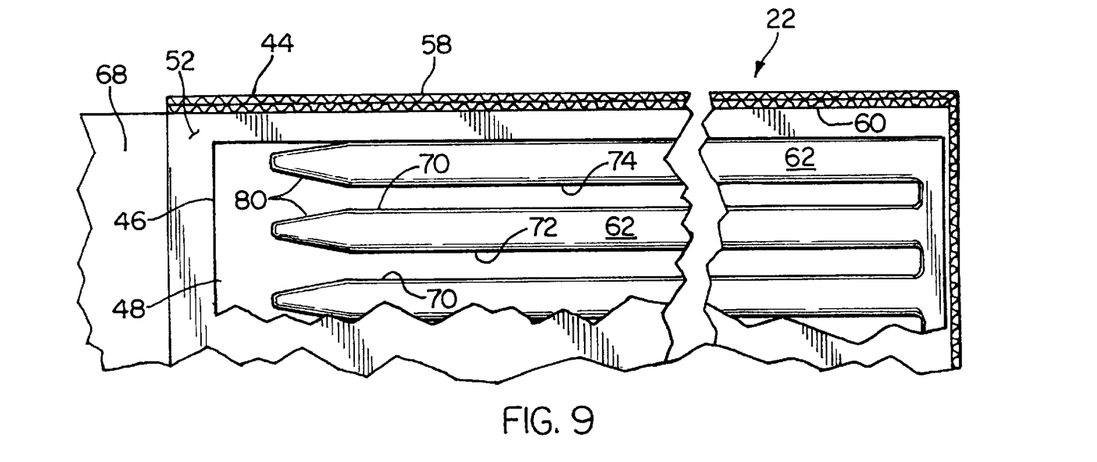
FIG. 9 is a fragmentary cross-sectional view of the dispenser of FIG. 5 taken along section line 9—9.

As shown in FIG. 5, when a number of glue boards 20 are positioned within the dispenser 22, the finger grips 76 of the boards 20 are positioned one above the other for rapid one hand removal and placement of the individual boards. From time to time a PCO, when setting fresh glue boards 20, will come across a glue board which has been exposed to the environment and become coated with dust or debris and has passed its useful life without trapping a rodent. The expired glue board 20 may then be inserted into an empty space in the dispenser 20 and replaced with a new unit. When the dispenser 22 has been emptied of fresh glue boards 20, the expired glue boards placed therein, and the dispenser 22, may be disposed of. As shown in FIG. 9, to guide the entry of a glue board 20 into the dispenser 22, inlet ramps 80 are provided on the projections 62 adjacent the access closure 61. To prevent the over-insertion of a glue board 20 into the dispenser 22, the projections 62 are preferably blocked by end walls or stops 82 at the rear of the box 44.

Figure 7:
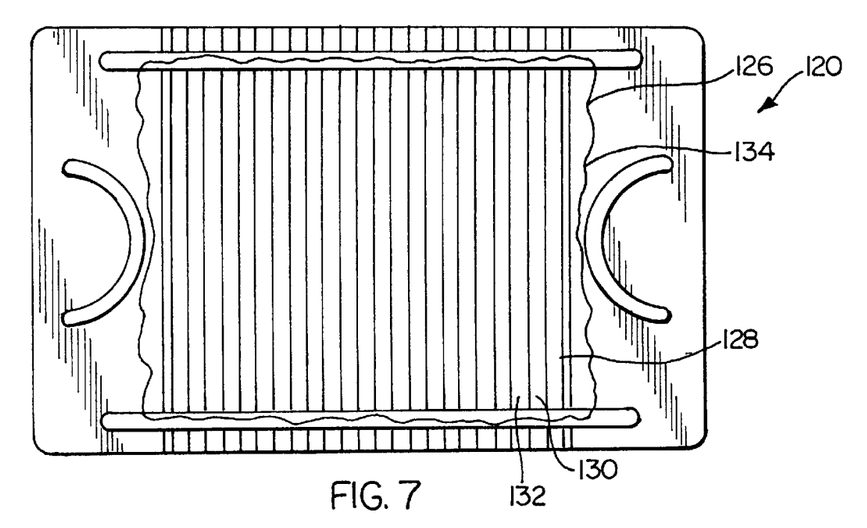
FIG. 7 is a top plan view of an alternative embodiment glue board intended for entrapment of mice.

The glue boards of this invention may be manufactured in a variety of sizes, depending on the targeted rodent. A glue board 120 intended for entrapment of mice is shown in FIG. 7. The glue board 120 has a shorter runway 134, and is narrower than the glue board 20, but employs a similar aggressive mechanical surface 128, comprised of alternating ridges 130 and valleys 132, which is covered with adhesive 126.

Figure 8:
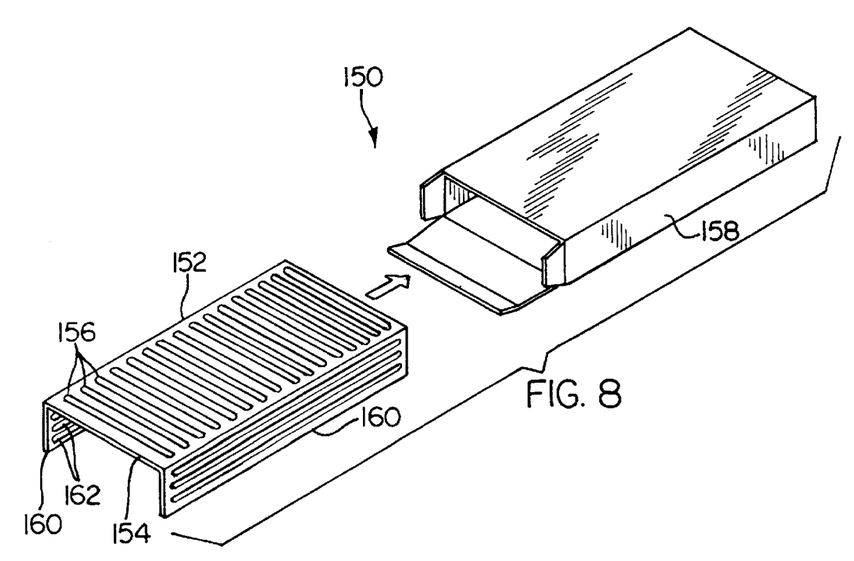
FIG. 8 is an exploded isometric view of a dispenser for the mouse glue board of FIG. 7.

For consumer applications it may be desirable to supply dispensers of lower capacity. A consumer dispenser 150 is shown in FIG. 8. The consumer dispenser 150 is preferably formed of non-corrugated paperboard and has an attractive printable surface. As this material is generally less stiff than corrugated paperboard, the thermoformed plastic insert 152 has a roof flap 154 which is molded with transverse roof ribs 156. The roof ribs 156 contribute to the stiffening of the paperboard box 158. The insert 152 has rack members 160 with projections 162 similar to those discussed above.

It should be noted that, although the glue boards have been illustrated as rectangular, square, polygonal, or other geometric shapes may also be provided. Furthermore, the glue contained within the glue boards may be scented or provided with other attracting features to encourage rodent advancement onto the entrapping glue.

It should be noted that although the base sheets of this invention have been disclosed as being thermoformed out of thin sheets of plastic, the sheets could also formed of other material. For example, thin sheets of aluminum or other metal could be stamped to form a base sheet. Metal base sheets are advantageous in that the temperatures at which the hot melt is dispensed would not significantly affect a metal base sheet. Nonetheless, the dispensers of this invention are adapted to dispense glue boards formed with metal base sheets, as well as the glue boards of this invention, or even glue boards of conventional type provided with adequate side margins for support and retention within the rack members.

It is understood that the invention is not limited to the particular construction and arrangement of parts herein illustrated and described, but embraces such modified forms thereof as come within the scope of the following claims.

We claim:

1. An article for entrapping rodents, comprising:

a) a base sheet having an inlet access end that extends generally horizontally for positioning adjacent a horizontal support surface;

b) portions of the base sheet which define a plurality of closely spaced transverse ridges jointly defining a rodent runway extending along the base sheet, wherein valleys are defined between adjacent ridges, and wherein an initial ridge is defined extending upwardly from the horizontal access end, the horizontal access end extending to the initial ridge; and c) a quantity of adhesive disposed on the base sheet to fill the valleys and overlie the ridges, wherein the adhesive is mechanically retained by the valleys and ridges on the base sheet, and wherein an adhesive surface is presented on the runway for encounter by a targeted rodent, the runway extending between the inlet access end and an outlet access end, wherein the adhesive extends over the initial ridge onto the inlet access end, and wherein the base sheet terminates at a level below the level of the adhesive at the inlet access end and outlet access end, such that the quantity of adhesive extends above the level of the base sheet at the inlet access end and the outlet access end.

2. The article for entrapping rodents of claim 1 further comprising:

a) two stiffening ribs which extend upwardly from the base sheet on either side of the runway, the ribs serving to rigidify the base sheet; and b) a plurality of protrusions extending from the base sheet adjacent to each stiffening rib exterior to the runway, the protrusions further contributing to the stiffness of the base sheet.

3. The article or entrapping rodents of claim 2 further comprising a dispenser comprising:

a) a container having two opposed parallel side walls connected by a top wall and a bottom wall; and b) a plastic rack member positioned adjacent each side wall, wherein each rack member has a plurality of parallel projections, and wherein the base sheet is supported on a projection on each rack member, and is slidable thereon for removal from the dispenser.

4. The article for entrapping rodents of claim 3, wherein the dispenser rack member projections have an upper surface which engages a base member beneath the plurality of protrusions, and a lower surface which engages a base member above the plurality of protrusions.

5. An article for entrapping rodents, comprising: a base sheet, the base sheet having portions which protrude to define a first surface which defines a rodent runway extending along the base sheet between a rodent inlet and a rodent outlet, the base sheet extending from an inlet portion for positioning substantially adjacent a horizontal support surface, to an inlet initial ridge which projects upwardly, to a series of adjacent transverse ridges, to an outlet initial ridge which projects upwardly and then to an outlet portion for positioning substantially adjacent said horizontal support surface; and b) a quantity of adhesive disposed on the base sheet to overlie the first surface, said first surface mechanically restraining movement of the adhesive on the surface, wherein the adhesive extends over the inlet initial ridge on to the inlet portion and over the outlet initial ridge on to the outlet portion, wherein an adhesive surface is presented on the runway for encounter by a targeted rodent, the adhesive extending above the level of the rodent inlet and the rodent outlet along the runway, the adhesive thereby extending into the direction of travel of a rodent onto the base sheet.

6. The article for entrapping rodents of claim 5 wherein the portions of the base sheet which define an aggressive mechanical surface comprise a plurality of protruding ridges, with a plurality of valleys defined between the ridges, the adhesive being mechanically engaged within the valleys and over the ridges.

7. The article for entrapping rodents of claim 5 wherein the base sheet has two opposite access ends, and wherein the access ends present minimal impediments to the progress of a rodent onto the rodent runway.

8. The article for entrapping rodents of claim 7 wherein the base sheet has no raised lip or ledge which extends above the level of the adhesive surface at the access ends.

9. An article for entrapping rodents, comprising:

a) a base sheet having portions defining a rodent runway extending from a sheet inlet to a sheet outlet, wherein the sheet inlet and the sheet outlet comprise generally horizontal segments disposed to extend adjacent a horizontal support surface;

b) portions of the base sheet which define a plurality of closely spaced ridges which extend substantially transverse to the rodent runway, the ridges being positioned along the rodent runway, wherein valleys are defined between adjacent ridges, and access ends onto the base sheet are defined leading onto and off the rodent runway at the sheet inlet and the sheet outlet, and wherein portions of the base sheet extend upwardly from the sheet inlet and the sheet outlet to define an initial ridge at each access end of the base sheet; and c) a quantity of adhesive disposed on the base sheet to fill the valleys and overlie the ridges, the adhesive being mechanically retained by the valleys and ridges on the base sheet, the adhesive extending over the initial ridges and onto the horizontal access ends of the base sheet, and an adhesive surface is presented on the runway for encounter by a targeted rodent, the glue on the access ends having portions which are uncontained by the base sheet in a direction parallel to the base sheet, such that the glue faces into the path of a rodent approaching the runway.

10. A glue board type rodent trap comprising:

a) a base sheet having two spaced marginal ribs which extend upwardly from the base sheet, the ribs defining the sides of an elongate rodent runway having spaced, open, access ends defined between the marginal ribs, wherein the base sheet has generally horizontal portions at the access ends for positioning adjacent a horizontal support surface, the horizontal portions at the access ends being lower than the level of the marginal ribs at the open access ends, the marginal ribs being discontinuous and not connected to one another, but being separated from one another by the horizontal portions;

b) a layer of pressure sensitive adhesive delineating a rodent entrapment surface in the runway, the surface extending longitudinally from one access end to the other and laterally from one of the ribs to the other, the level of the adhesive extending above the horizontal portions the access ends;

c) the base sheet having a plurality of raised portions between the access ends and between the ribs, the raised portions being covered by the adhesive layer, the raised portions including an initial ridge adjacent each access end horizontal portion, the adhesive extending over the initial ridges onto the horizontal portions;

d) portions of the adhesive layer adjacent the raised portions having a depth dimension between the entrapment surface and the base sheet greater than the depth dimension of the layer between the entrapment surface and the raised portion thereby providing adhesive adjacent the raised portions which enhances the rodent retention of the layer; and e) the raised and adjacent portions of the base sheet together providing adhesive layer to base-sheet engagement surfaces having a total area greater that the area of the entrapment surface to engage the quantity of adhesive with the base sheet to retain the adhesive against shifting off the base sheet.

11. The rodent trap of claim 10 wherein adhesive at the access ends has a thickness, such that the entrapment surface at each of the access ends faces not only upwardly, but also into the path of a rodent approaching the runway to thereby present minimal impediments to the progress of a rodent traversing a path of travel along the runway.

12. A rodent trap of the glue board type comprising:

a) a base sheet having an adhesive engagement and adherence surface;

b) a layer of pressure sensitive adhesive adhered to the base sheet surface and defining an elongate rodent runway including a rodent entrapment surface;

c) the base sheet engagement and adherence surface including projecting portions extending from adjacent recessed portions toward the adhesive entrapment surface, the projecting portions and the recessed portions collectively providing the engagement and adherence surface with a total surface area substantially greater than the area of the adhesive entrapment surface to permit use of a higher tackiness adhesive while inhibiting adhesive flow due to enhanced adherence of the adhesive to the base sheet;

d) the entrapment surface having spaced end portions near ends of the runway, the end portions being interconnected by a substantially planar central section of the entrapment surface, the entrapment surface extending between side ribs which project from the base sheet to at least the level of the entrapment surface, the side ribs being spaced from one another to define a portion between the side ribs which is below the level of the adhesive, such that a break is defined between the side ribs which does not protrude from the base sheet above the level of the adhesive; and e) the end portions each extending from an underlying recess portion to the central portion to present outwardly unobstructed exposed entrapment surface sections at both ends of the runway at said break which face into the path of a rodent approaching the base sheet, the base sheet being lower than the side ribs at the end portions.

* * * * *